United States Patent [19]

Ichihara

[11] Patent Number: 5,227,968
[45] Date of Patent: Jul. 13, 1993

[54] METHOD FOR ELIMINATING SCATTERED γ-RAYS AND RECONSTRUCTING IMAGE, AND GAMMA CAMERA APPARATUS

[75] Inventor: Takashi Ichihara, Ootawara, Japan

[73] Assignee: Kabushiki Kaisha Toshiba, Kawasaki, Japan

[21] Appl. No.: 501,039

[22] Filed: Mar. 29, 1990

[30] Foreign Application Priority Data

Mar. 30, 1989 [JP] Japan .................................. 1-79619
Feb. 23, 1990 [JP] Japan .................................. 2-43598

[51] Int. Cl.$^5$ .......................................... G06F 15/00
[52] U.S. Cl. .................................. 364/413.24; 378/87
[58] Field of Search ................... 364/413.24; 378/87; 250/363.02, 363.1

[56] References Cited

U.S. PATENT DOCUMENTS

| | | |
|---|---|---|
| 4,212,061 | 7/1980 | Knoll et al. . |
| 4,258,428 | 3/1981 | Woronowicz .................... 364/413.24 |
| 4,546,255 | 10/1985 | Knoll et al. ...................... 364/413.24 |
| 4,839,808 | 6/1989 | Koral et al. ...................... 364/413.24 |
| 4,873,632 | 10/1989 | Logan et al. ..................... 364/413.24 |
| 5,081,581 | 1/1992 | Koral et al. ...................... 364/413.24 |

FOREIGN PATENT DOCUMENTS 0091823 4/1983 European Pat. Off. .

OTHER PUBLICATIONS

Koral et al., "SPECT compton–scattered photons in single–photon emission computerized tomography", The Journal of Nuclear Medicine, vol. 29, No. 2, Feb. 1988, pp. 195–202.
Axelsson et al., "Subtraction of compton–scattered photons in a single–photon emission computerized tomography", The Journal of Nuclear Medicine, vol. 25, No. 4, Apr. 1984, pp. 490–494.
Jaszczak et al., "Improved SPECT quantification using compensation for scattered photons", The Journal of Nuclear Medicine, vol. 25, No. 8, Aug. 1984, pp. 893–900.
"Reduction of the Effects of Scattered Radiation on a Sodium Iodide Imaging System", Bloch et al., Journal of Nuclear Medicine, vol. 14, No. 4, pp. 67–72, 1972.
"Subtraction of Compton–Scattered Photons in Single-Photon ... Tomography", Axelsson et al., Journal of Nuclear Medicine, vol. 25, No. 4, pp. 490–494, 1984.
"SPECT Compton–Scattering Correction by Analysis of Energy Spectra", Koral et al., Journal of Nuclear Medicine, vol. 29, No. 2, pp. 195–202, 1988.
"Scatter Compensation Techniques for SPECT", Jaszczak et al., IEEE Transactions on Nuclear Science, vol. NS-32, No. 1, pp. 786–793, 1985.

Primary Examiner—Roy N. Envall, Jr.
Assistant Examiner—Laura Brutman
Attorney, Agent, or Firm—Cushman, Darby & Cushman

[57] ABSTRACT

A method of eliminating scattered gamma rays and collecting an image comprises the steps of detecting a radioisotope (RI) given to a living body, to form an RI distribution image, and eliminating scattered gamma rays generated in the living body or a gamma camera from the RI distribution image. In this case, the energy spectrums of gamma rays incident to individual positions in the gamma camera in association with pixels of the RI distribution image are collected at the same time as or during the collection of the RI distribution image. A ratio of the scattered gamma rays with respect to the RI distribution image is acquired from the energy spectrum for each position, and a scattered gamma ray component is eliminated from the RI distribution image for each pixel, by multiplying the ratio of the scattered gamma rays to the RI distribution image.

12 Claims, 8 Drawing Sheets

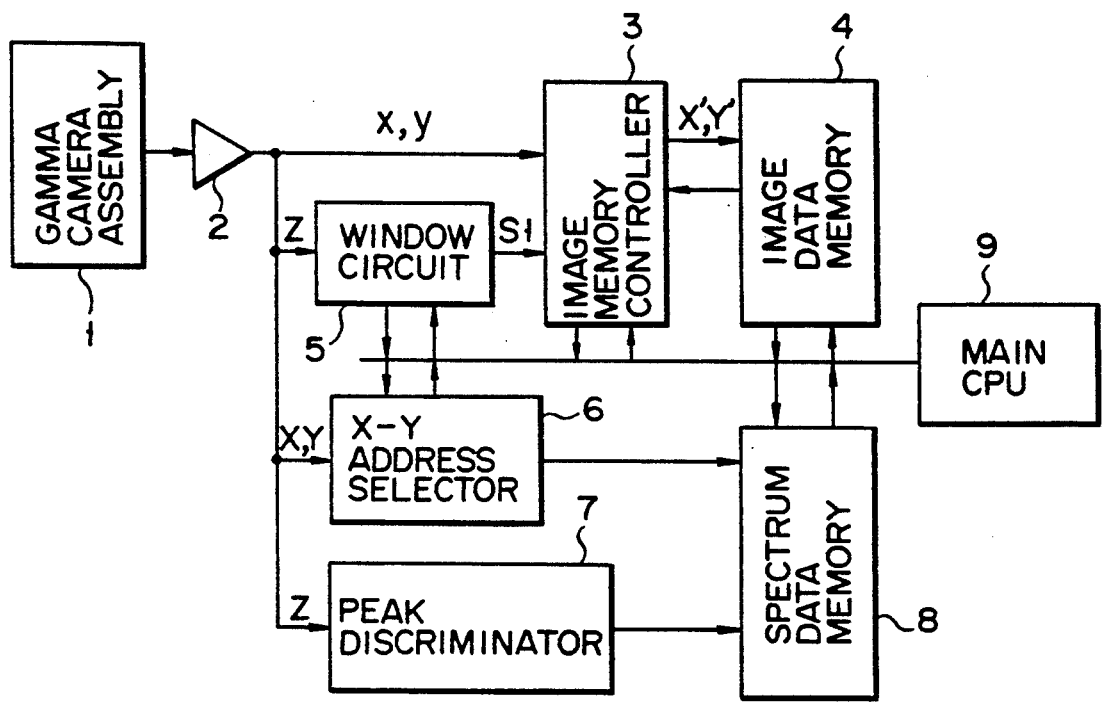
F I G. 1
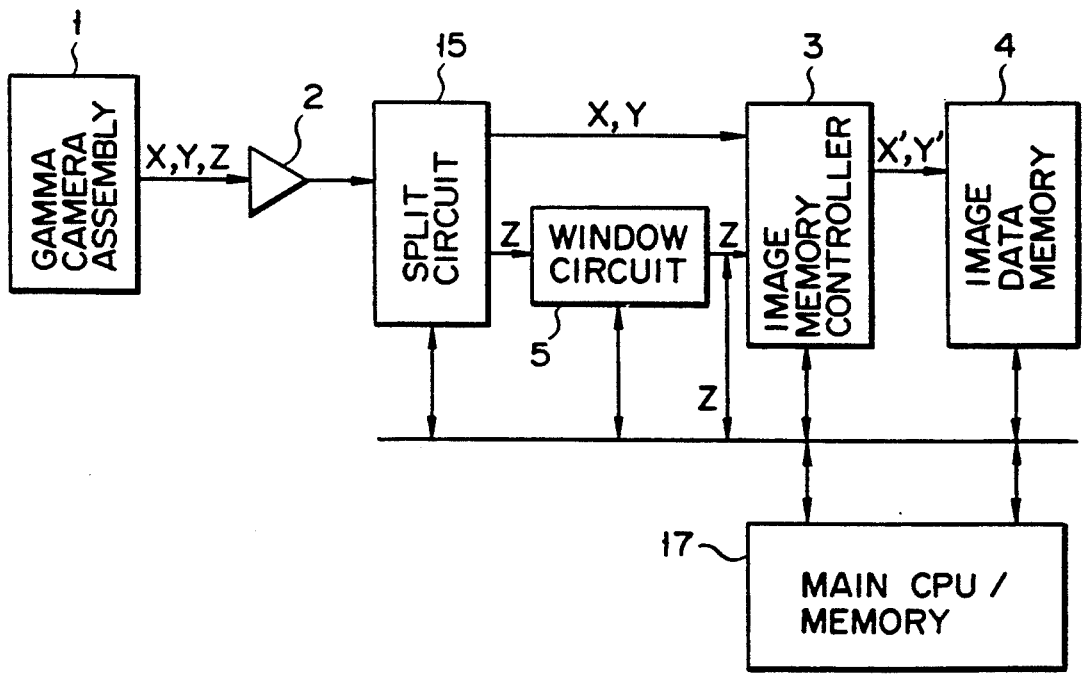
F I G. 2

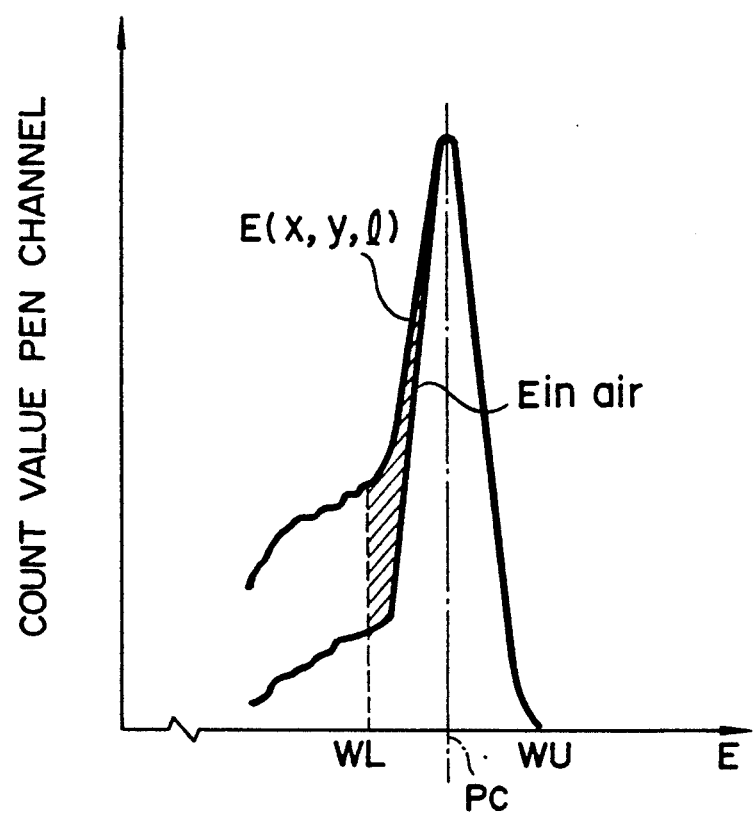
F I G. 6

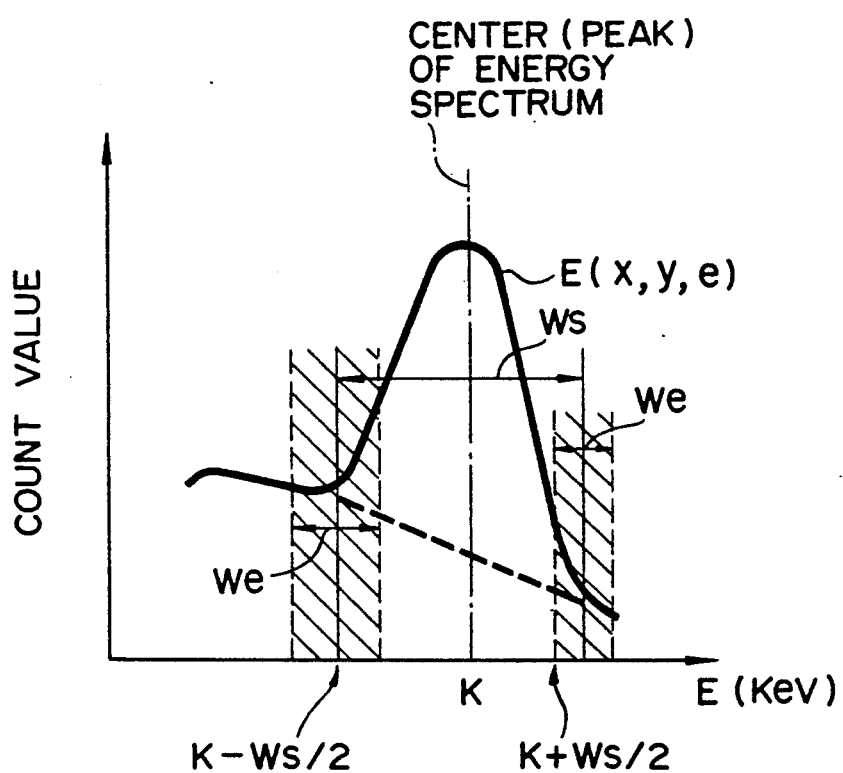
F I G. 7

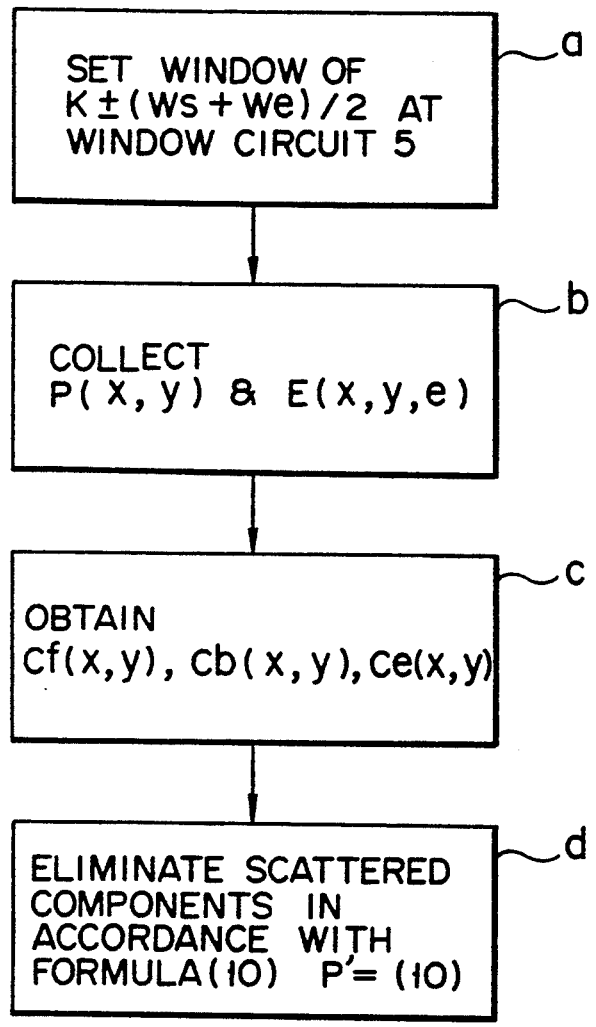
F I G. 8

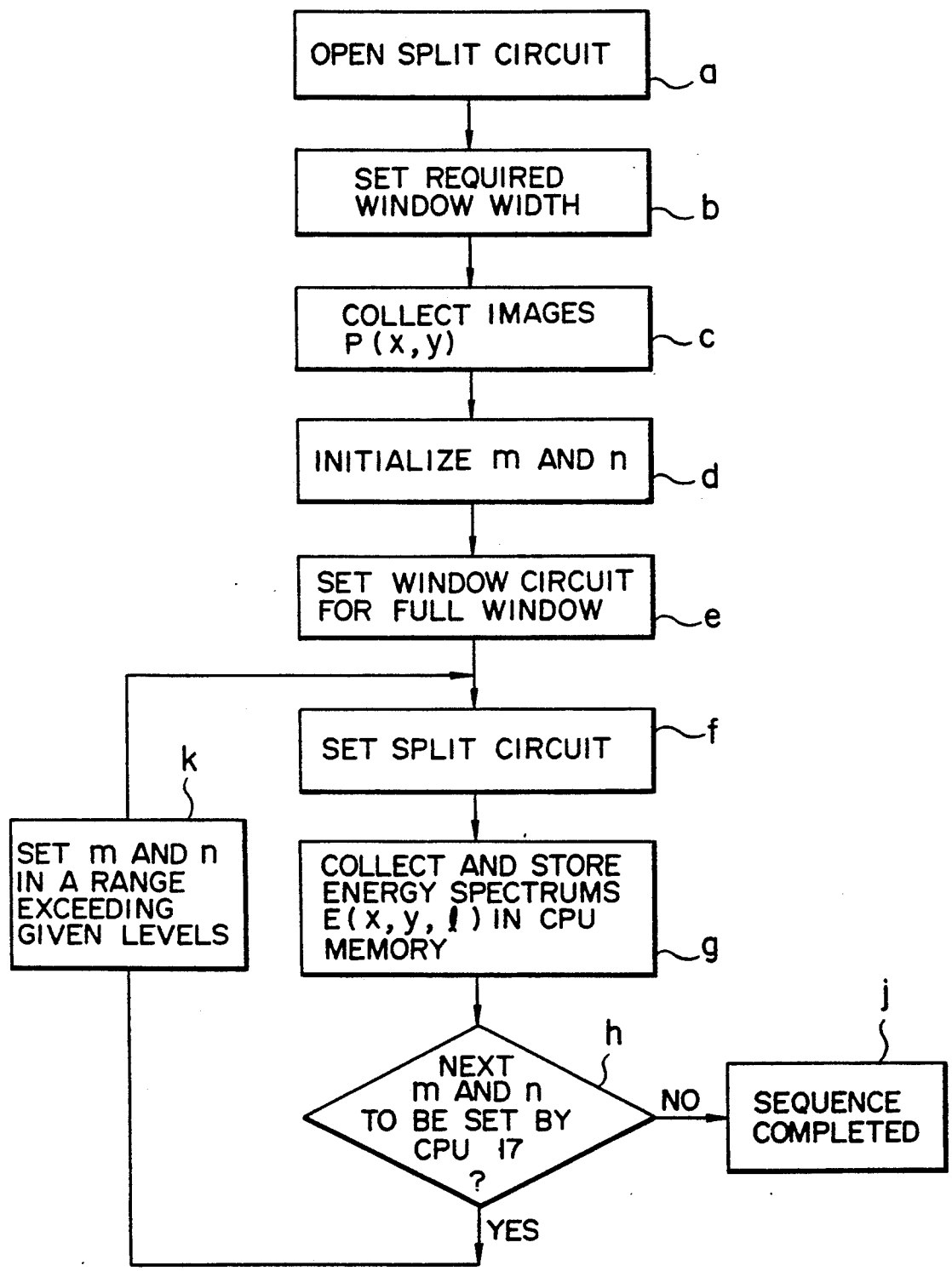
F I G. 9

METHOD FOR ELIMINATING SCATTERED γ-RAYS AND RECONSTRUCTING IMAGE, AND GAMMA CAMERA APPARATUS

BACKGROUND OF THE INVENTION

1. Field of the Invention

The present invention relates to a method for eliminating scattered γ-ray for collecting an and image of detected γ-irradiated from a radioisotope to a living body and accumulated or deposited in an organ, to form an RI distribution image, and eliminates scattered γ-rays in the living body and scattered γ-rays in a gamma camera from this RI distribution image, by setting a window.

2. Description of the Related Art

Nuclear medical apparatuses have been used to detect a radioisotope given to a living body and accumulated or deposited in an organ using a gamma camera and to form an image of the two-dimensional distribution of the radioisotope for diagnostic use. In this system, scattered γ-rays (scattered gamma-rays) are generated in the living body or in the gamma camera (e.g., collimator or NaI scintillator). Since the scattered γ-rays are not necessary for diagnostic information, they should be eliminated. There are two methods known of eliminating scattered Y-rays from an image acquired by a gamma camera (scintillation camera) or the like as disclosed in J. Nucl. Med. 14; 67–72, 1972, J. Nucl. Med. 25; 490–494, 1984, J. Nucl. Med. 29; 195–202, 1988, and IEEE. Tran. Nucl. Science. NS32. 786-793, 1985.

According to the first method, a window a0 is set for a photoelectric peak Pl in the relation of the amplitude versus an energy spectrum E as shown in FIG. 10 (Prior Art). Images within the window a0 are collected and a window b0 is set for a Compton scattered component C0 at the same time or as the next sequence. Based on a photoelectric image A(x, y) and a scattered-ray image S(x, y) acquired from the windows a0 and b0, a process of A(x, y)-R.S(x, y) is executed as a method of eliminating the scattered rays, where radioisotope is a constant representing a predicted ratio of scattered rays included in a photoelectric absorbing peak P1.

According to the second scattered-ray eliminating method, as scattered γ-rays have a distribution dependent on a position (x, y), they are taken as an image more accurately than in the first method. In the relation of the amplitude versus the energy spectrum E as shown in FIG. 11 (Prior Art), therefore, a window having a sufficiently narrow window width ΔE is sequentially shifted from El to Ep having a peak. At this time, images E(x, y) in individual steps El-Ep are collected and their respective energy images dependent on the γ detected positions, at which γ-rays are detected by the gamma camera, are formed, whereby scattered components for the individual positions are acquired.

Those conventional methods of eliminating scattered rays, however, have the following shortcomings.

The first method eliminates scattered γ-rays using only one value of the predicted constant radioisotope. If the distribution of scattered rays varies depending on γ detected positions, however, this distribution differs from the actual physical phenomena. Therefore, the proper scattered-ray elimination cannot be performed for those positions, thus providing less accurate images.

According to the second method, improving the accuracy in eliminating scattered rays requires making ΔE smaller and collection of a large number of images. This takes a significant amount of time in collecting the images. Further, in order to eliminate nuclide scattered rays having two or more photoelectric peaks position signal, a greater number of images should be collected, thus requiring a longer time for collecting images.

SUMMARY OF THE INVENTION

Accordingly, it is an object of this invention to provide a scattered γ-ray eliminating method and an image collecting method and a gamma camera apparatus which can accurately and simply eliminate scattered γ-rays in a living body or a gamma camera even if these scattered γ-ray depend on the detection positions in the gamma camera.

According to the present invention, there is provided a scattered γ-ray eliminating method and an image collecting method of detecting γ-rays irradiated from a radioisotope given to a living body to form an RI distribution image. The method eliminates scattered γ-rays generated in the living body or in a gamma camera from this RI distribution image by setting a window. In the window, RI distribution images are collected and energy spectrums of γ-rays incident to individual positions in the gamma camera at the same time or during the collection are collected in association with the RI distribution image, a ratio of scattered γ-rays is obtained from the energy spectrum for each position, and a scattered γ-ray component is eliminated from the RI distribution image for each pixel based on the ratio.

A gamma camera apparatus comprises a gamma camera, having a scintillator and a plurality of photomultipliers, for outputting γ-rays irradiated from a radioisotope given to a living body as position signals x and y and an energy signal Z proportional to the energy of γ-rays, a first memory for storing an RI image at an address designated by the position signals x and y when the energy signal Z from the gamma camera is within a predetermined value range, a second memory for storing the energy signal Z from the gamma camera assembly for each position as an energy spectrum, and a controller for controlling writing of the energy signal Z into the second memory and writing of the RI image into the first memory.

The gamma camera collects the energy spectrum E depending on the position (x, y) at the same time as or following collection of RI images whereby the whole position-dependent spectrum image is accurately processed, the ratio of scattered rays is acquired from this spectrum, and the collected images are multiplied by this ratio. As a result, scattered γ-rays can be accurately and simply eliminated for each detected position in the gamma camera. Therefore, the speed for processing the RI image is increased and the resolution of the collected images is improved. In a case where nuclides that generate γ-rays of two or more energies or two types or more of nuclides of different energies are simultaneously collected and scattered rays are eliminated from the collected image, in particular, this scattered-ray elimination can be executed accurately and simply.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 1 is a schematic block diagram of a gamma camera apparatus to which a method of eliminating scattered γ-rays and collecting an image according to one embodiment of the present invention is applied;

FIG. 2 is a block diagram of a gamma camera according to another embodiment of this invention;

FIG. 6 is a schematic diagram illustrating the relation between the energy and amplitude per channel according to this invention;

FIG. 7 is a diagram illustrating an energy spectrum E and a count value of photoelectrons;

FIG. 8 is a diagram illustrating a flowchart for acquiring the area NPA of a photoelectric peak;

FIG. 9 is a flowchart for scattered γ-ray elimination and image collection executed by the gamma camera apparatus shown in FIG. 2.

DETAILED DESCRIPTION OF THE PREFERRED EMBODIMENTS

Figure 3:
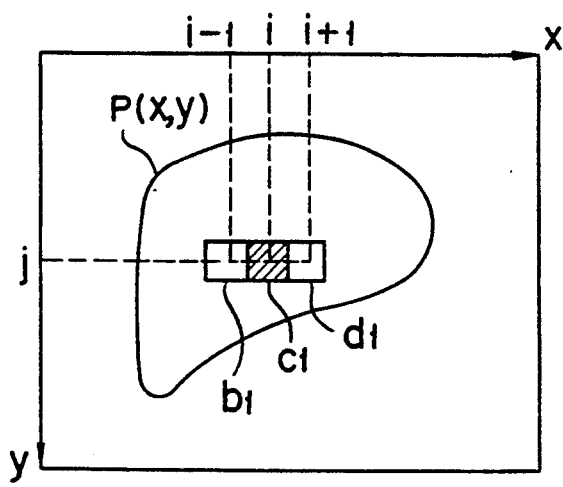
FIG. 3 is a diagram illustrating an RI image obtained by a gamma camera.

Referring to FIG. 1, a scintillation camera 1 (called a gamma camera) has a scintillator and a plurality of photomultipliers, and is connected to an A/D converter 2. This A/D converter 2 converts position signals x and y and an energy signal Z from the scintillation camera 1 into digital signals. The A/D converter 2 has its output terminal connected to input terminal of an image memory controller 3, a window circuit 5, an x-y address selector 6 and a peak discriminator 7. The window circuit 5 issues a write enable command S1 to the image memory controller 3 when the energy signal Z from the A/D converter 2 falls within the width between the upper limit WU and lower limit WL of a given window set by a main CPU 9. The x-y address selector 6 selects x and y addresses in accordance with the position signals x and y from the A/D converter 2. Upon reception of the write enable command S from the window circuit 5, the image memory controller 3 serving as a control circuit, adds "1" to the content of an x-y corresponding memory address on an image data memory 4 in response to the address signal from the x-y address selector 6 and writes image data in the memory 4. The position (x, y) for the energy signal Z input to the window circuit 5 is discriminated by the x-y address selector 6. Further, the peak of the signal Z is discriminated by the peak discriminator 7, "1" is added to the content of the memory address corresponding to an energy associated with the magnitude of the spectrum signal Z corresponding to the position (x, y) of a spectrum data memory 8, and an energy spectrum (X, Y, e) corresponding to the position is collected at the same time as collection of images. In other words, the energy spectrum Z at the position (X, Y) in the scintillation camera is stored in the form of a combination of energy spectrums (X, Y, e) in the data memory 8. The window circuit 5 sets the window width corresponding to about 20–30% of the energy of a photoelectric peak according to a control signal from the main CPU 9. The image memory 4 stores an RI distribution image i.e., γ-ray distribution image P (x, y) obtained at the coordinates (x, y) of the gamma camera to which there is input the input energy within the window width set by the window circuit 5. The spectrum data memory 8 stores an energy spectrum for each position in the field of view of the gamma camera, and stores spectrums E (x, y, e) collected within a sufficiently wider window width in order to presume a ratio of the scattered components with in respect to the γ-rays within the photoelectric peak to stored in the image memory 4.

Figure 4A:
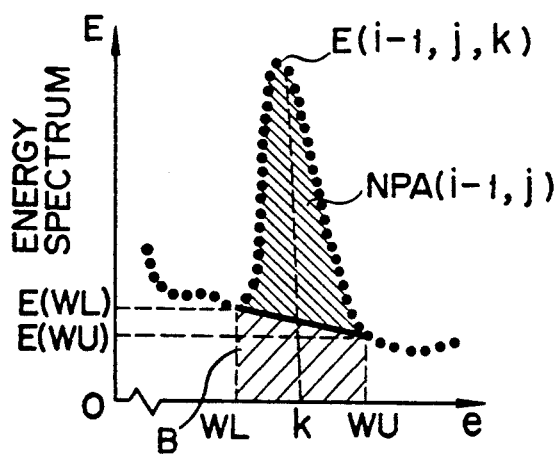
FIGS. 4A through 4C are schematic diagrams illustrating energy spectrums at individual positions of the RI image shown in FIG. 3.
Figure 4B:
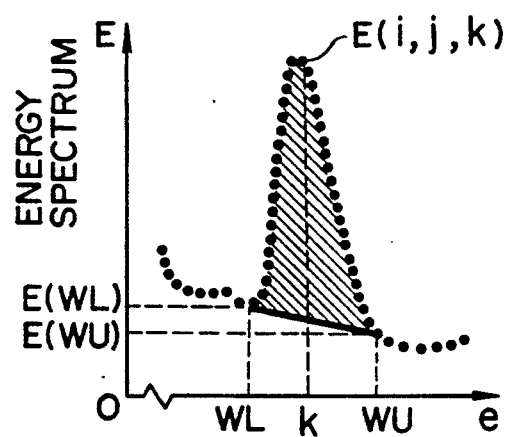
Figure 4C:
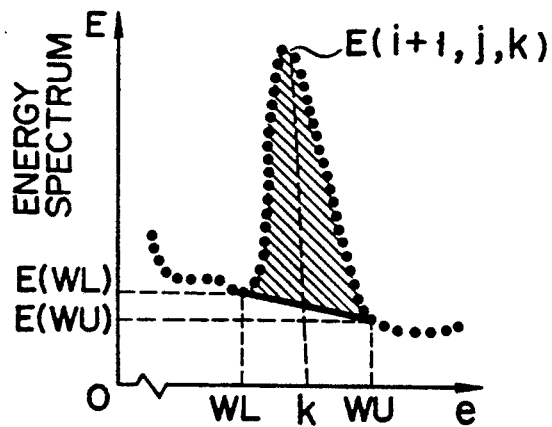

FIG. 3 illustrates a collected γ-ray distribution image (hereinafter referred to as collected image or P (x, y)). FIGS. 4A through 4C illustrate the relation between the energy spectrum collected in association with each pixel position (i−1, j;i, j;i+1, j) of a collected image in FIG. 3 (hereinafter referred to as energy spectrum or E (x, y, e)) and the collected γ-ray distribution image (collected image or P (x, y)).

Referring to FIGS. 1 through 4, there will now be described the scattered γ-ray eliminating method, the image collecting method and the gamma camera.

An RI image signal including scattered γ-rays from the gamma camera 1, i.e., the position signals x and y and energy signal Z, are converted into digital signals by the A/D converter 2. The position signals x and y are input to the x-y address selector 6 while the energy signal Z is input to the window circuit 5 and peak discriminator 7. The window circuit 5, which receives a command from the main CPU 9, collects an image P (x, y) in a certain window width, e.g., a width of 20–30% of the photoelectric peak energy. At the same time, the window circuit 5 collects the energy spectrums E (x, y, e) corresponding to the position on an image with the full window width (step A).

Then, the main CPU 9 determines whether or not the count of the collected energy spectrum is large (step B). If the count is large, the position of the photoelectric peak is detected for E (x, y, e) (step C). Further, the area of the photoelectric peak, NPA (Net Peak Area), within WL≦e≦WU with respect to the window position (upper limit position WU, lower limit position WL) set at the time of collecting P (x, y) is obtained from the following equation (1).

$$NPA(x, y) = \int_{WL}^{WU} E(x, y, e)de - B(x, y) \quad (1)$$

where $B(x, y) = \{E(x, y, WU) + E(x, y, wI)\} \times (WU - WL)/2.$

That is, the photoelectric peak NPA (x, y) and scattered ray component B (x, y) are obtained (step D). Then, the RI image P (x, y) is multiplied by the ratio of the scattered rays as expressed by the following equation (2).

$$P(x, y) \times NPA(x, y) / \{NPA(x, y) + B(x, y)\} \quad (2)$$

Through execution of the equation (2), an image P' having scattered rays eliminated can be acquired (step E).

In step B, if the count of the energy spectrum is smaller than a given value, the image memory controller 3 executes a filtering process using the following equation (3) with the filtering coefficient a1 to reduce the statistic noise of the amplitude.

$$a1 = \begin{pmatrix} a11 \ldots & \ldots a21 + 1, 1 \\ \cdot & \cdot \\ \cdot & \cdot \\ \cdot & \cdot \\ a1, 2m+1 \ldots & a21+1, 2m+1 \end{pmatrix} \quad (3)$$

$$E'(i, j, k) = \sum_{m=1}^{2M+1} \left( \sum_{l=1}^{2L+1} a1, m \, E(i - (1+1) + 1, j - (M+1)m, k) \right)$$

Then, after a more accurate energy spectrum is obtained by shading off the position information (step F), the process following the step C is executed.

Therefore, the collected image P (x, y) is replaced with the image P' (x, y) free of a scattered component which deteriorates the quantization of the image.

According to this embodiment, as described above, the energy spectrum E dependent on the position (x, y) is accurately processed as the whole position-dependent image at the same time as the image collection, and the ratio of the scattered rays is obtained from this spectrum. The collected image P (x, y) is multiplied by this ratio. As a result, the scattered rays can be accurately and simply eliminated, thus increasing the image processing speed and improving the resolution of the diagnostic image. Further, nuclide that irradiates γ-rays of two or more energies or two or more types of nuclides of different energies can be simultaneously collected as images from which scattered rays can be eliminated in an accurate and simple manner.

Figure 5:
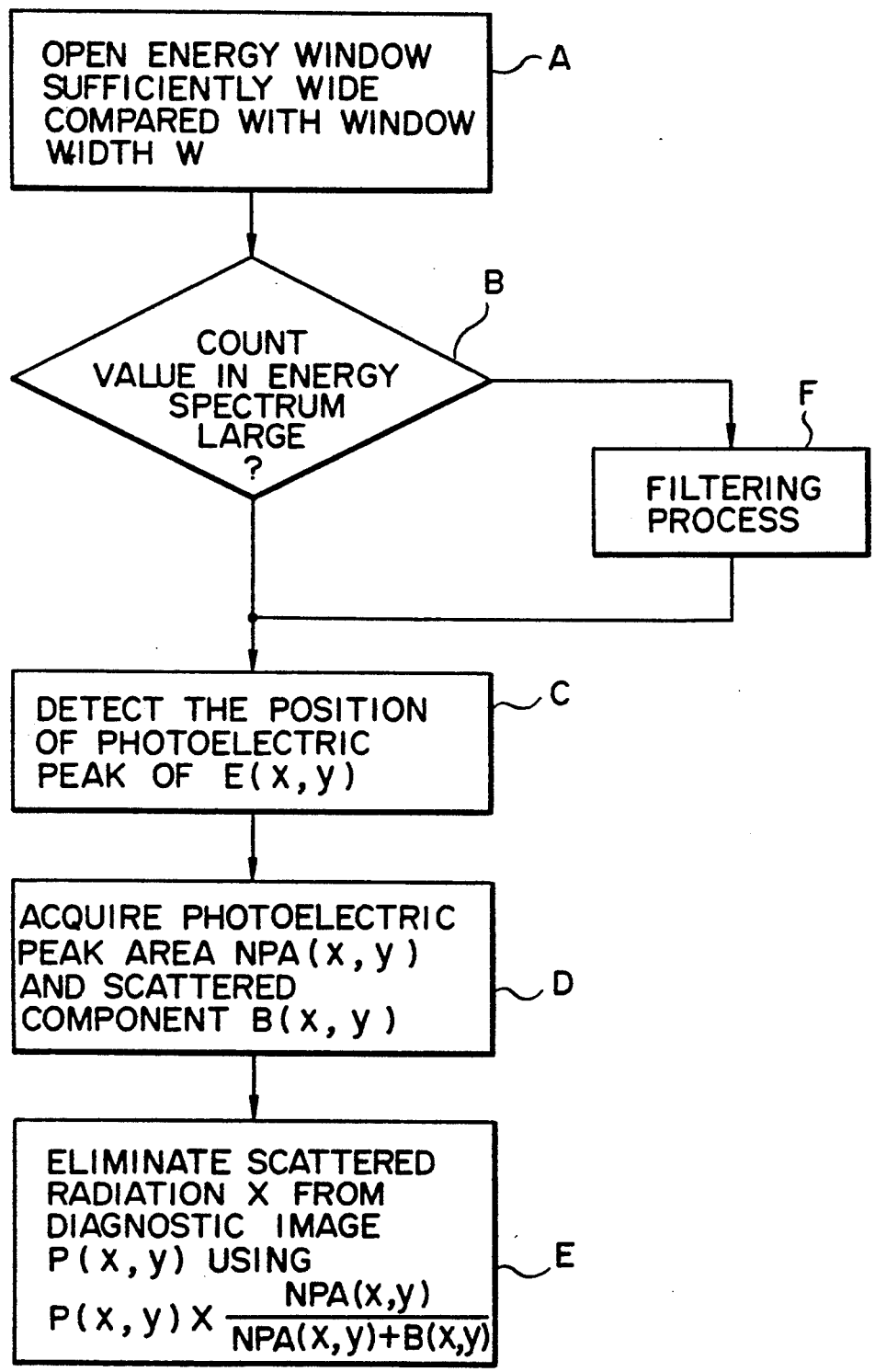
FIG. 5 is a flowchart for scattered γ-ray elimination and image collection executed by the gamma camera apparatus shown in FIG. 1.
Figure 10:
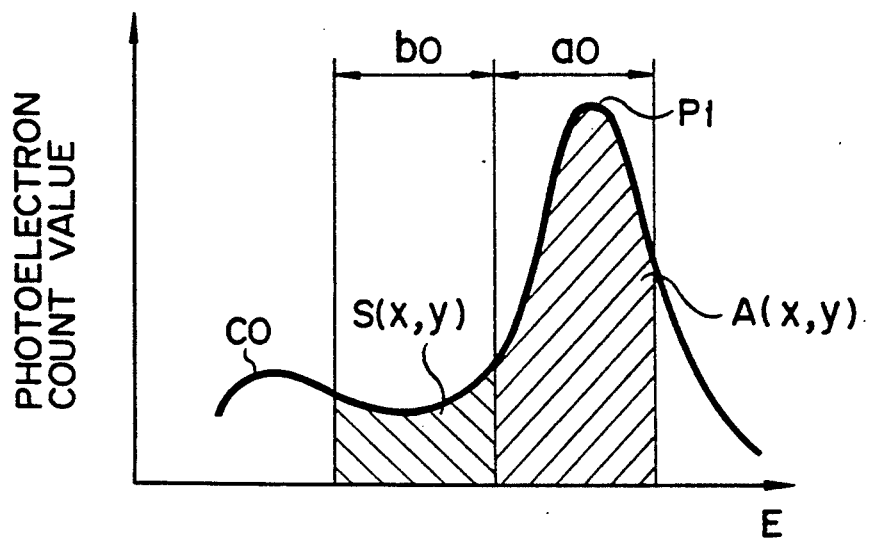
FIGS. 10 (Prior Art) and 11 (Prior Art) diagrams for explaining a conventional method of eliminating scattered γ-rays and collecting an image.
Figure 11:
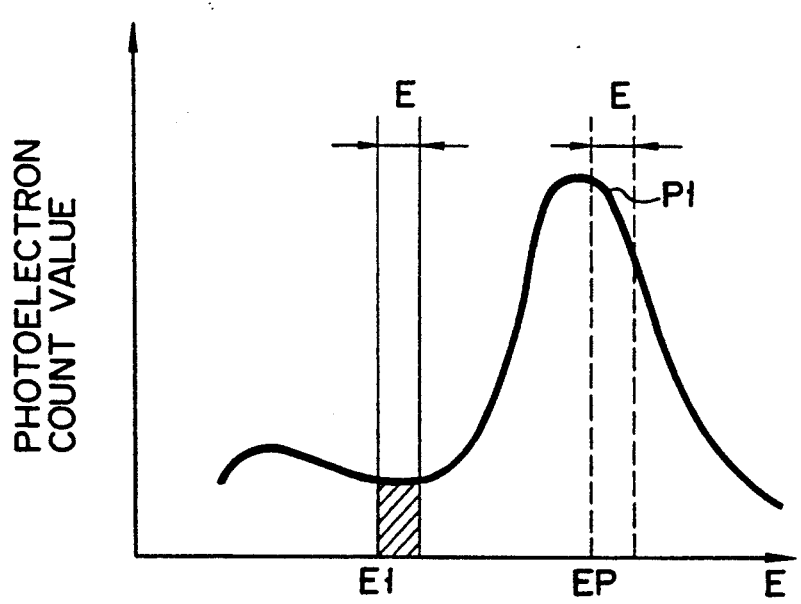

In the steps C-E of eliminating scattered rays from the collected image as shown in FIG. 5, since the scattered components within the energy spectrum are considered only as the shaded portion B of the energy spectrum E (i−1, j, k) in FIG. 4A, or the base background of the energy spectrum E, they are eliminated.

However, in clinical examinations, since γ-rays irradiated from RI (radioisotope) distributed in a living body are scattered in the body, the shape of the photoelectric peak is deformed as compared with the one attained when no scattering material exists in the living body. Utilizing this phenomenon, the amount of deformation is measured, given that the measured value is S (x, y), a more accurate NPA can be acquired from the following equation (4).

$$NPA'(x, y) = NPA(x, y) - S(x, y) \quad (4)$$

The above processing will be described more specifically referring to FIG. 6.

Given that E (x, y, e) is the energy spectrum in clinic and Einair (x, y, e) is the energy spectrum in the air where no scattering material exists, i.e., the response function of the scintillation camera, then S (x, y) can be obtained from the equation (5) below.

$$S(x, y) = \int_{WL}^{WU} [E(x, y, e) - Einair(x, y, e)] de \quad (5)$$

where Einair is integer-multiplied so that, for example, the peak and the corner of a curve, coincide with each other in the range Pc<e<WU. In other words, the above equation can be rewritten as the following equation (6).

$$S(x, y) = \int_{WL}^{WU} E(x, y, e) - A \cdot Einair(x, y, e) de \quad (6)$$

Then, A (real number) to minimize the result of the equation (6).

A more detailed algorithm for squiring the area NPA of the photoelectric peak in the above manner by this embodiment will be described below, referring to FIG. 7. In FIG. 7, the horizontal scale indicates the energy spectrum E, and K is a main peak energy. The peak discriminator 7 shown in FIG. 7 is designed to collect energy spectrums within the same energy range as the energy window width set by the window circuit 5. In the window circuit 5 at this time is set a window of K±(Ws+We)/2 for the main peak energy K, where Ws is a preset energy window width and We is an arbitrary energy width set such that it partially overlaps the edge portion of Ws.

For instance, there two values are so set as to make (Ws/K)×100= approximately 20% and We≈approximately 2 to 4 KeV. Further, the coefficients expressed by the following equations are computed.

$$Ct(x, y) = \int_{K - (Ws/2 + We/2)}^{K + (Ws/2 + We/2)} E(x, y, e) dE \quad (7)$$

$$Ch(x, y) = \int_{K + Ws/2 - We/2}^{K = (Ws/2 + We/2)} E(x, y, e) dE \quad (8)$$

$$Ce(x, y) = \int_{K - Ws/2 + We/2}^{K - Ws/2 + We/2} E(x, y, e) dE \quad (9)$$

Then, a diagnostic image P (x, y) is multiplied by the ratio of scattered rays using the individual coefficients to predict NPA (x, y), as expressed by the following equation.

$$P(x, y) \times \frac{Ct - \frac{(Ch + Ce) \times Ws}{2We}}{Ct} \quad (10)$$

Based on the result of the above computation, P' free of scattered rays is acquired.

FIG. 8 illustrates a flowchart for acquiring P' in the above manner. First, a window width of K±(Ws+We)/2 is set as described above (step a). Then, the diagnostic image P (x, y) and energy spectrum E (x, y, e) are computed (step b) followed by the computation of the individual coefficients Ct (x, y), Ch (x, y) and Ce (x, y) (step c). Finally, after NAP (x, y) is computed using the equation (10), the scattered ray component is eliminated on the basis of NPA (x, y) to provide the image P' free of the scattered rays (step d).

With NPA acquired through the above method, if the amplitude is low, the scattered-ray component B (x, y) can accurately be predicted by specifying the individual coefficients, Ct, Ch and Ce. Accordingly, the scattered component can accurately be eliminated and the collecting time can be shortened. In other words, although it is difficult to accurately obtain the scattered-ray component B (x, y), the component B (x, y) can be stably determined since the term (Ch+Ce)Ws/2We in the equation (10) can be expressed as B (x, y)≈(Ch+Ce)Ws/2We. It should however be noted that the above is applicable to a system having a energy resolution of 10 to 15% in terms of a half-width.

The second embodiment of the present invention will be described below.

There will now be described a case where a gamma camera is applied to a single-photon emission (hereinafter referred to as SPECT).

To begin with, P (x, y) represents an collected image by the aforementioned scintillation camera. The gamma camera is rotated 360° or 180° around an object to be examined, and collects a projection image for each n degrees to acquire a projection image P (x, y, θ). For instance, if n=6°, the energy spectrum is collected for each projection image to acquire E (x, y, θ) where θ represents the angle at which the image collection is done. Accordingly, the scattered ray elimination for each angle θ is performed in the above-described procedures shown in FIG. 5 for a projection image P (x, y, θ) for each angle θ. The same effect as described above can be obtained in an apparatus using a tomographic image.

If the amplitude of the energy spectrum is insufficient to provide a sufficient accuracy, it may be assumed that a change distribution of scattered rays does not depend so much on the angle compared with a projection image, and the energy spectrum for each 2·n or 3·n degrees can be used as a mean value.

The third embodiment will be described below referring to FIG. 2. The same reference numerals as used in FIG. 1 are used to denote the identical or corresponding elements.

The split circuit 15 output, to the image memory controller 3, only position signals x and y which falls in a specific range of x0<X<x1, y0<Y<y1 with respect to the A/D converted position signals. The circuit also outputs the energy signal Z to the window circuit 5. Under certain conditions, the position signals x and y in the specific range are stored by the image memory controller 3, at the corresponding X-Y address in the image data memory 4. Under other conditions, the energy spectrum E (x, y, e) of γ-rays set by the split circuit 15 and entered in the range (x, y) (hereinafter referred to as "split"), is collected by a main CPU memory 17.

The collection of the scintigram images and the energy spectrum in this device will be described referring to the flow chart illustrated in FIG. 7.

First, x and y are set to be 0<x, y<xmax, ymax. The split circuit 15 is driven by the main CPU/memory 17 for full window with 0<x<xmax, 0<y<ymax (step a). The CPU/memory 17 sets the required window width for example, 20% with respect to the main peak in the window circuit 5 (step b), then collects image P (x, y) (step c). The CPU/memory 17 initializes m and n (step d), and sets the window circuit 15 for full window (step e). Further, the CPU/memory 17 sets the split circuit 15 within a predetermined range in accordance with $m \cdot \Delta x \leq x < (m+1) \cdot \Delta x$, $m \cdot \Delta y \leq y < (m+1) \cdot \Delta y$ (step f).

Then, the energy spectrum E (x, y, e) is collected and stored in the main CPU/memory 17 (step g). Next m and n are set by the main CPU 17 (step h). When these m and n are set, those m and n within the range which exceeds a certain count on the already collected image P (x, y) are set (step k). If the next m and n are not set, the sequence is terminated (step j).

Even if the energy spectrum E (x, y, e) and collected image P (x, y) are not simultaneously collected, therefore, the scattered rays can be eliminated from the final information acquired in the same manner as done in the case of simultaneous collection, except for those of earlier movement tests.

In the actual clinic or, SPECT collection, the time can be shortened by setting θ greater than the collecting angle n by the energy spectrum E (x, y, e) as per the second embodiment. However, it takes a substantial amount of time for collection if the energy spectrum E over the entire image is collected. Alternatively, in a region of interest (hereinafter referred to as ROI) having a count more than a predetermined value may be set in the collected image P (x, y, θ) before the energy spectrum is collected, and the write enable command s1 may be issued so as to collect the energy spectrum E only within the ROI.

According to the present invention, the energy spectrum E depending on the position (x, y) is collected at the same time as or following the image collection to accurately process the whole image of the spectrum, the ratio of the scattered rays can be acquired from this spectrum, and the collected image is multiplied by this ratio, thus ensuring accurate and simple elimination of the scattered rays. This increases the processing speed and improves the resolution of the diagnostic image. Further, if images of a nuclide irradiating γ-rays of two or more energies or two or more types of nuclides with different energies, for example, are collected simultaneously for elimination of scattered rays, the scattered ray eliminating method and image collecting method can be executed in an accurate and simple manner.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A method of eliminating scattered γ-rays and collecting an image comprising the steps of:

detecting γ-rays irradiated from a radioisotope (RI) given to an object and thereby collecting an RI image in a predetermined energy value window width;

collecting energy spectrums of γ-rays incident to individual positions in a gamma camera at the same time as said RI image is collected, wherein said individual positions in said gamma camera correspond to pixels of said RI images;

acquiring an energy level ratio of said scattered γ-rays from said energy spectrum for each of said individual positions; and multiplying said RI image by said ratio to eliminate a scattered ray component from said RI image for each of said pixels.

2. A method according to claim 1, wherein said RI image collecting step collects said RI image in accordance with an energy value window width corresponding to 20 to 30% of a peak energy of detected γ-rays.

3. A method according to claim 1, wherein said energy spectrum collecting step collects said energy spectrum in a window width greater than said RI image predetermined window width.

4. A gamma camera apparatus comprising:
a gamma camera, having a scintillator and a plurality of photomultipliers, for detecting a γ-ray irradiated from a radioisotope (RI) given to an object and outputting position signals representing said detected γ-rays and an energy signal proportional to an energy of said γ-ray;
first memory means for storing image data at an address corresponding to said position signals and collecting an RI image when said energy signal from said gamma camera is within a predetermined energy value window width;
second memory means for storing said energy signal from said gamma camera as an energy spectrum for each position of said gamma camera; and
control means for acquiring an energy level ratio of scattered rays from said energy spectrum for each said position and multiplying said image data by said ratio to eliminate a scattered ray component from said RI image for each pixel of said RI image.

5. A gamma camera apparatus according to claim 4, wherein said first memory means includes window means for passing said energy signal falling within said predetermined energy value window width.

6. A gamma camera apparatus according to claim 5, wherein said predetermined energy value window width is 20 to 30% of a peak energy of γ-rays.

7. A gamma camera apparatus according to claim 4, wherein said first memory means includes address selecting means for selecting an address according to said position signal and outputting an address signal.

8. A gamma camera apparatus according to claim 7, wherein said first memory means includes a first memory for storing image data in response to said address signal.

9. A gamma camera apparatus according to claim 4, wherein said first memory means stores a γ-ray distribution image corresponding to an input energy signal in a predetermined window width, and said second memory means stores an energy spectrum for each position in a field of view of said gamma camera.

10. A gamma camera apparatus according to claim 4, further comprising means for filtering said position signal and energy signal in accordance with a level of an energy spectrum.

11. A gamma camera apparatus according to claim 4, wherein said energy spectrum is collected at angles larger than angles at which said image data is collected while said gamma camera is rotating around said object.

12. A gamma camera for obtaining a radioisotope (RI) image representing a distribution of radioisotopes provided into an object, comprising:
detection means for detecting positions and incident energies of gamma rays irradiated from said radioisotopes;
RI image means for counting said incident energies based on said detected positions to form an RI image when said incident energies fall within a predetermined range;
spectrum means for counting said incident energies of said gamma rays based on said detected positions and detected incident energies to form positional energy spectrums; and
presuming means for presuming positional scatter values based on positions within said predetermined range from said positional energy spectrums to eliminate said scatter values from said RI image.

* * * * *